(12) United States Patent
McNamara et al.

(10) Patent No.: US 9,863,647 B1
(45) Date of Patent: Jan. 9, 2018

(54) BYPASS VALVE

(71) Applicants: Michael McNamara, Coventry, RI (US); Hans L. Kuster, Barrington, RI (US)

(72) Inventors: Michael McNamara, Coventry, RI (US); Hans L. Kuster, Barrington, RI (US)

(73) Assignee: AquaMotion, Inc., Barrington, RI (US)

( * ) Notice: Subject to any disclaimer, the term of this patent is extended or adjusted under 35 U.S.C. 154(b) by 0 days.

(21) Appl. No.: 15/235,907

(22) Filed: Aug. 12, 2016

(51) Int. Cl.
*F24D 17/00* (2006.01)
*E03B 7/04* (2006.01)
*F16K 31/00* (2006.01)
*E03B 7/09* (2006.01)

(52) U.S. Cl.
CPC .......... *F24D 17/0094* (2013.01); *E03B 7/045* (2013.01); *E03B 7/09* (2013.01); *F16K 31/002* (2013.01); *Y10T 137/6497* (2015.04)

(58) Field of Classification Search
CPC ........ E03B 7/045; E03B 7/09; F24D 17/0094; F16K 31/002; Y10T 137/6497
USPC .......................................................... 137/337
See application file for complete search history.

(56) References Cited

U.S. PATENT DOCUMENTS

| | | | | |
|---|---|---|---|---|
| 2,603,420 A | * | 7/1952 | Tacchi ................... | F16K 31/002 192/82 T |
| 2,842,155 A | * | 7/1958 | Peters ................ | G05D 23/1326 122/13.3 |
| 3,062,448 A | * | 11/1962 | Read ........................ | F02M 3/09 236/93 R |
| 3,397,841 A | * | 8/1968 | Kieslich .............. | F24D 19/1006 236/12.17 |
| 4,331,292 A | * | 5/1982 | Zimmer .................. | F24D 17/00 137/337 |
| 5,603,344 A | * | 2/1997 | Hall, Jr. .............. | F24D 17/0094 122/13.3 |
| 6,536,464 B1 | | 3/2003 | Lum et al. | |
| 6,929,187 B2 | | 8/2005 | Kempf et al. | |
| 7,073,528 B2 | | 7/2006 | Kempf et al. | |
| 7,140,382 B2 | | 11/2006 | Kempf et al. | |
| 7,287,707 B2 | | 10/2007 | Kempf et al. | |
| 7,475,703 B2 | | 1/2009 | Kempf et al. | |
| 7,874,498 B2 | | 1/2011 | Kempf et al. | |
| 7,971,601 B2 | * | 7/2011 | Lum ..................... | F16K 31/002 137/337 |
| 8,210,441 B2 | | 7/2012 | Kempf et al. | |
| 8,522,814 B2 | | 9/2013 | Kempf et al. | |
| 8,820,652 B2 | | 9/2014 | Kempf et al. | |

* cited by examiner

*Primary Examiner* — Michael R Reid
*Assistant Examiner* — Jonathan Waddy
(74) *Attorney, Agent, or Firm* — Salter & Michaelson (57) ABSTRACT

A bypass valve is for support between hot and cold water lines that connect to respective hot and cold fixtures. The bypass valve includes a valve body having an internal chamber, a hot water inlet port, a hot water outlet port and a discharge port; a bi-metal spring; a support member for mounting the bi-metal spring within the internal chamber of the valve body; and a shuttle mounted to the bi-metal spring and constructed and arranged to mate with the discharge port in a closed position of the bi-metal spring. The bi-metal spring assumes an open position to disengage from the discharge port at a predetermined water temperature to enable the hot water to discharge through the discharge port to the cold water line.

14 Claims, 6 Drawing Sheets

BYPASS VALVE

FIELD OF THE INVENTION

The present invention relates in general to a bypass valve for use in home or industrial water distribution systems that supply water to various fixtures. More particularly, the present invention relates to bypass valves that are thermostatically controlled so as to automatically bypass water that is not at the desired temperature for use at the fixture. Even more particular, the present invention pertains to a thermostatically controlled bypass valve that employs a circulating pump.

BACKGROUND OF THE INVENTION

There presently exist bypass valve constructions that are meant to be installed under a bathroom or kitchen sink. Under sinks one normally finds two valves that are attached to pipes extending through the wall below the sink. The left side valve is normally connected to the hot water supply and the right side valve is normally connected to the cold water supply. These valves are also called angle stops because the water flow makes a turn in them from generally horizontal to vertical and when one closes these valves it stops the water flow to the sink fixture. Attached to these valves one finds hoses or pipes that connect to the sink fixture.

If no bypass valve is installed the water in the hot supply pipe over time will cool if the fixture is not opened so when one turns on the hot water faucet one has to wait for this cooled hot water to be emptied out of the line before hot water from the hot water source, either a hot water tank or tank-less water heater, reaches the sink fixture. During this waiting period water is being wasting as the cooled hot water in the line goes down the drain. To save this wasted water and the wait time, a bypass valve can be installed under the sink which maintains hot water to the fixture. There are several valves on the market today that do this and the present invention proposes an improvement in the bypass valve that uses a different technique to maintain hot water at the fixture.

The way these bypass valves work is they react to changes in the temperature of the water in the hot water supply line to the fixture. To do this they are installed between the hot water supply to the fixture and the cold water supply to the fixture. When one of these valves is installed a flow path is created that allows water from the hot water supply to the fixture to flow to the cold water supply to the fixture. This flow path is a loop since the cold water supply to the fixture is also the cold water supply to the hot water source (tank or tankless heater).

Simply connecting the hot and cold supplies may, not maintain hot water at the fixture. A pump is used to establish a flow from the hot supply to the cold supply. Normally the pump is installed into either the hot water line that leaves the heating source or in the cold water supply line to the heating source. The pump can run continuously or intermittently based on time or demand. Any time the pump is running and the under-sink valve opens water flows through the bypass from the hot supply of the fixture into the cold water supply of the fixture. Another way flow is initiated is to open the hot or cold faucets at the fixture. When this happens water could flow through the bypass and either cold water would cross over to the hot water faucet or hot water would cross over to the cold water faucet. To keep cold water from crossing over when the hot water faucet is opened, a check valve is included in the bypass valve. This stops the flow of cold water to the hot water faucet.

Accordingly, it is an object of the present invention to provide an improved bypass valve that prevents the hot water from crossing over when the cold water faucet is opened. In accordance with the present invention, a bi-metal coil valve is used that closes the internal bypass port in the valve when hot water reaches the valve (coil).

SUMMARY OF THE INVENTION

Accordingly, there is now provided a bypass valve for support between hot and cold water lines that connect to respective hot and cold fixtures. The bypass valve comprises; a valve body having an internal chamber, a hot water inlet port, a hot water outlet port and a discharge port; a bi-metal spring; a support member for mounting the bi-metal spring within the internal chamber of the valve body; and a shuttle mounted to the bi-metal spring and constructed and arranged to mate with the discharge port in a closed position of the bi-metal spring. The bi-metal spring assumes an open position to disengage from the discharge port at a predetermined water temperature to enable the hot water to discharge through the discharge port to the cold water line.

In accordance with further aspects of the present invention the hot water inlet port and hot water outlet port are arranged in-line with each other; the discharge port is arranged substantially orthogonal to the hot water inlet and outlet ports; including a pump for establishing a flow between the hot and cold water lines; the discharge port is defined by an insert that comprises an elongated post with a passage defining, at an internal end, the discharge port; the bi-metal spring is a coil spring having a center portion for support from the support member, said bi-metal coil spring arranged in multiple coil loops including an outer loop having a free end that supports said shuttle; the bi-metal coil spring is rotationally adjustable to provide an adjustable temperature range; the insert extends in a direction that is orthogonal to the hot water inlet and outlet ports, and said shuttle rotates circumferentially between open and closed positions of the bi-metal coil spring; the bi-metal spring is a coil spring having a center portion for support from the support member, said bi-metal coil spring arranged in multiple coil loops including an outer loop having a free end that supports said shuttle.

In accordance with the present invention there is also provided a bypass valve for support between hot and cold water lines that connect to respective hot and cold fixtures. The bypass valve comprises: a valve body having an internal open chamber, a hot water inlet, a hot water outlet and a discharge outlet having a discharge port; a bi-metal spring having an outer free end; a support member for mounting the bi-metal spring within the internal open chamber of the valve body; and a shuttle mounted to the outer free end of the bi-metal spring and constructed and arranged to mate with the discharge port in a closed position of the bi-metal spring. The bi-metal spring assumes an open position to disengage from the discharge port at a predetermined water temperature to enable the cooled hot water to discharge through the discharge port to the cold water line.

In accordance with further aspects of the present invention the hot water inlet port and hot water outlet are arranged in-line with each other; the discharge port is arranged substantially orthogonal to the hot water inlet and outlet; including a pump for establishing a flow between the hot and cold water lines; the discharge port is defined by an insert that comprises an elongated post with a passage defining, at an internal end, the discharge port; the bi-metal spring is a coil spring having a center portion for support from the support member, said bi-metal coil spring arranged in multiple coil loops including an outer loop having a free end that supports said shuttle; the bi-metal coil spring is rotationally adjustable to provide an adjustable temperature range; the insert extends in a direction that is orthogonal to the hot water inlet and outlet ports, and said shuttle rotates circumferentially between open and closed positions of the bi-metal coil spring.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
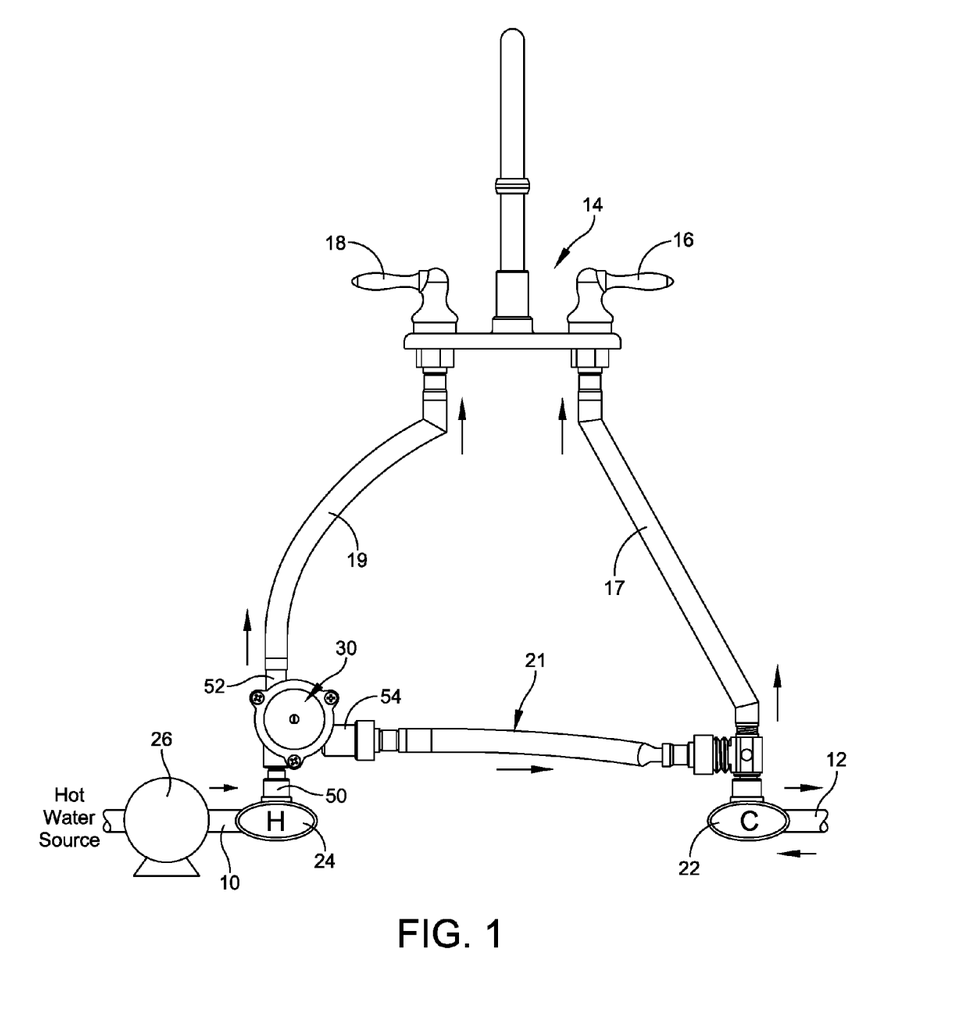
FIG. 1 is a schematic diagram of one embodiment of the use of a bypass valve in accordance with the present invention.
Figure 2:
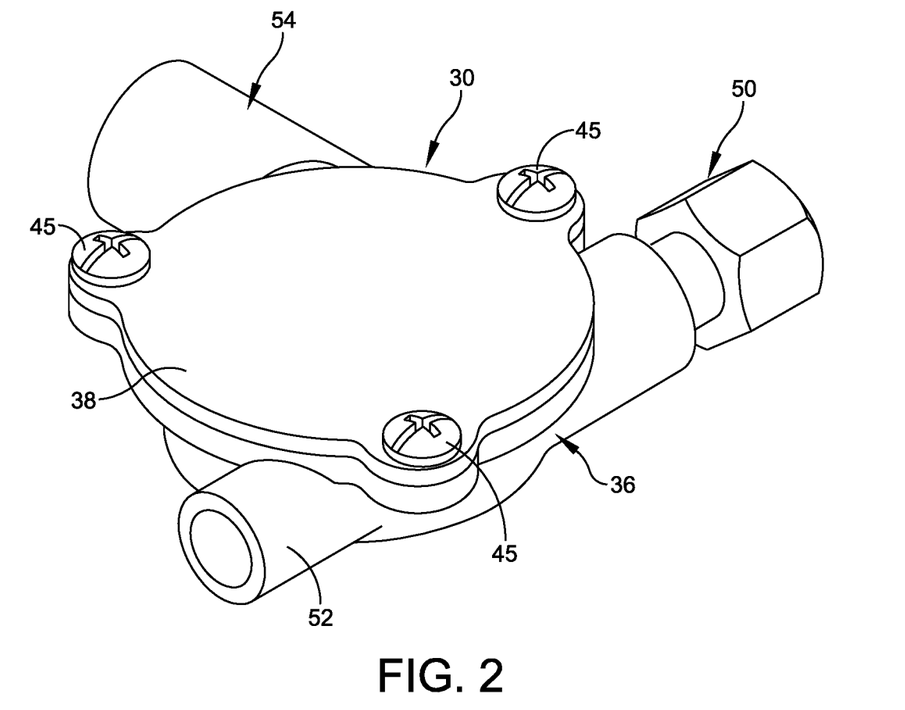
FIG. 2 is a perspective view of the bypass valve of FIG. 1.

Reference is now made FIGS. 1-6 for an illustration of one embodiment of the present invention. FIG. 1 in particular shows the basic water system with a hot water inlet at 10 and a cold water inlet at 12. The hot water inlet at 10 may be from a hot water heater or other source of heated water (not shown). FIG. 1 also depicts a typical fixture at 14 with respective hot and cold water faucets 16, 18. The system also typically includes turn-off valves 22 and 24 and interconnecting lines 17, 19. The bypass line is shown at 21. In the system diagram of FIG. 1 the bypass valve of the present invention is shown at 30 on the hot water side. FIG. 1 also shows a pump at 26.

Figure 4:
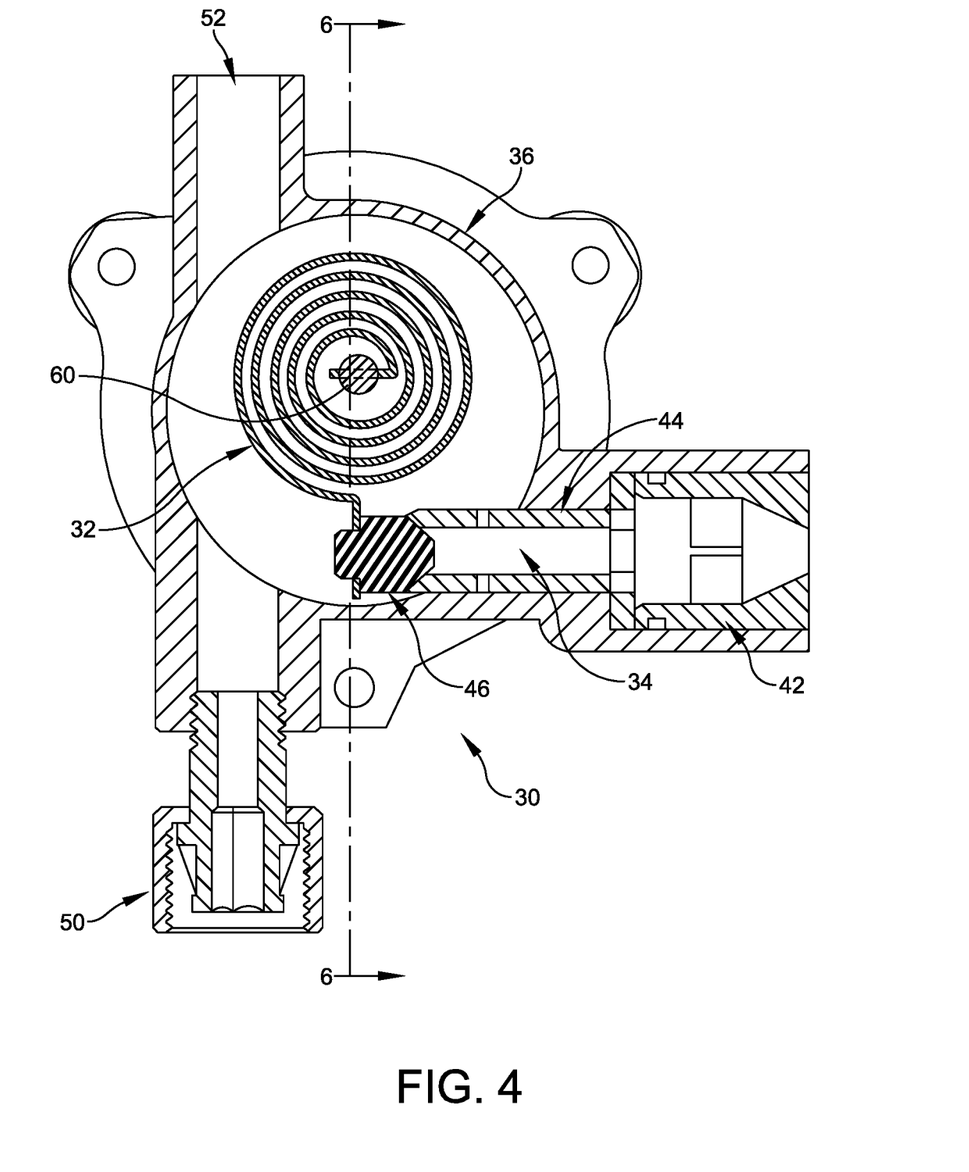
FIG. 4 is a cross-sectional view through the bypass valve of the present invention with the discharge port closed.
Figures 5, 5A:
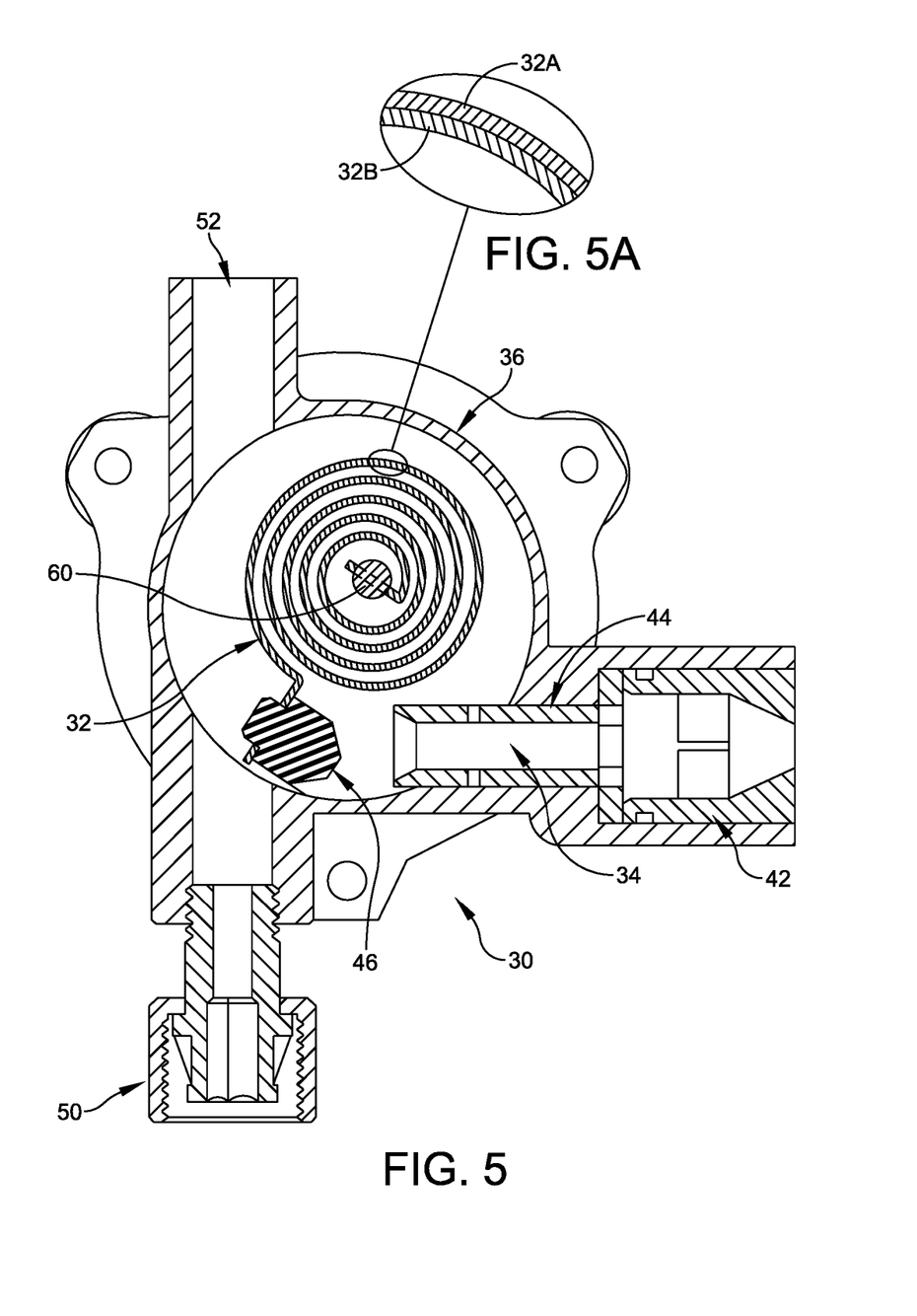
FIG. 5 is a cross-sectional view through the bypass valve of the present invention with the discharge port open.
FIG. 5A is a fragmentary view of the bi-metal feature of the coil.

The improvement in accordance with the present invention is in the form of an under sink hot water bypass valve 30 that employs a bimetal coil 32 to open and close a port 34 between the hot water and cold water supplies to a fixture to maintain a desired temperature range at the hot water faucet. Refer in particular to FIGS. 4 and 5. FIG. 4 is a cross-sectional view through the bypass valve 30 of the present invention with the discharge port closed while FIG. 5 is a cross-sectional view through the bypass valve 30 of the present invention with the discharge port open. The bi-metal coil 32 is illustrated in FIG. 5A as having separate, but connected sandwiched metal layers 32A and 32B that provide the bi-metal action of allowing the coil to essentially rotate between the positions shown in FIGS. 4 and 5 and dependent upon the temperature about the coil 32 caused by water flow past the coil 32.

Figure 3:
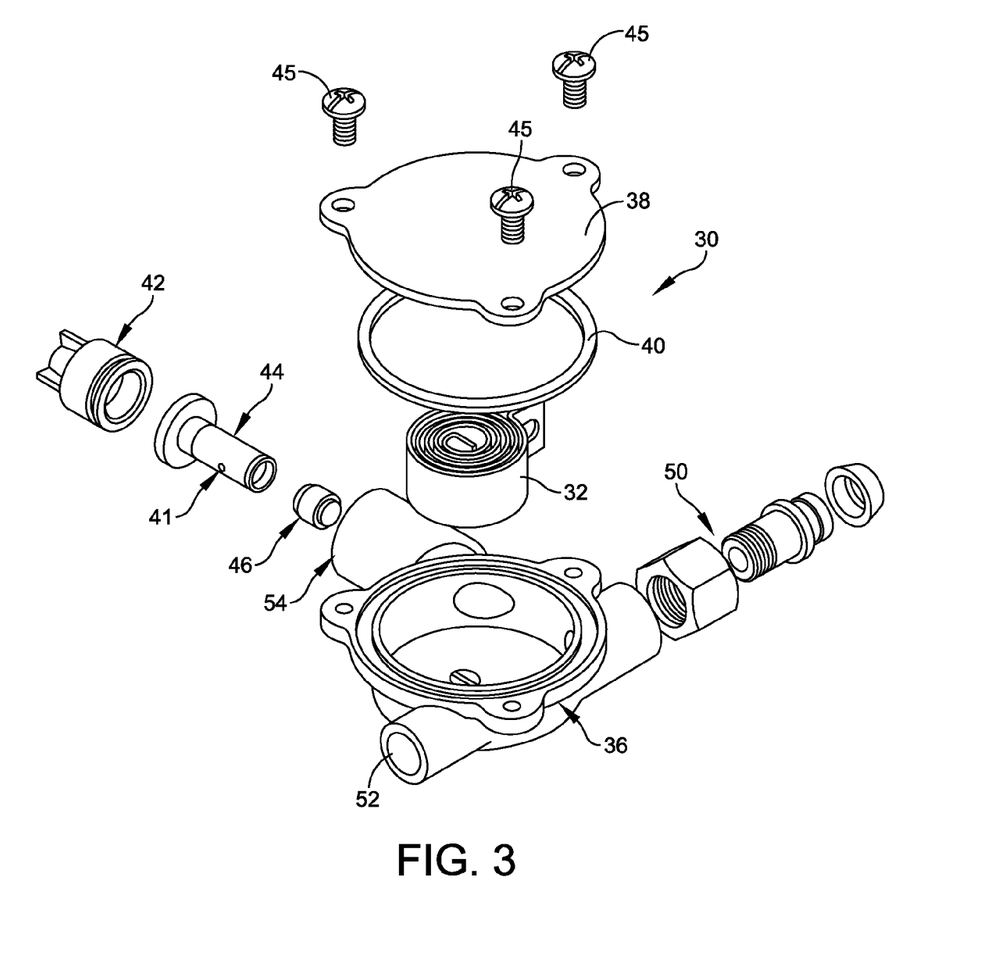
FIG. 3 is an exploded perspective view of the valve of FIG. 2 illustrating the various components that comprise the bypass valve of the present invention.

Reference is now made to the exploded perspective view of FIG. 3 where all the basic components that comprise the valve 30 are illustrated. This includes, in addition to the bimetal coil 32 to open and close the port 34, the valve housing 36, cover plate 38, gasket 40, check valve 42, valve insert 44 and shuttle 46. It is the shuttle 46 that actually opens and closes at the end of the insert 44 at port 34 as shown in FIGS. 4 and 5. Screws 45 are used to attach the cover plate 38 to the valve housing 36 with the gasket 40 being arranged between the cover plate 38 and the valve housing 36. Refer also to FIGS. 4 and 5 to illustrate the position of the check valve 42, valve insert 44 and shuttle 46 in the valve housing 36.

Figure 6:
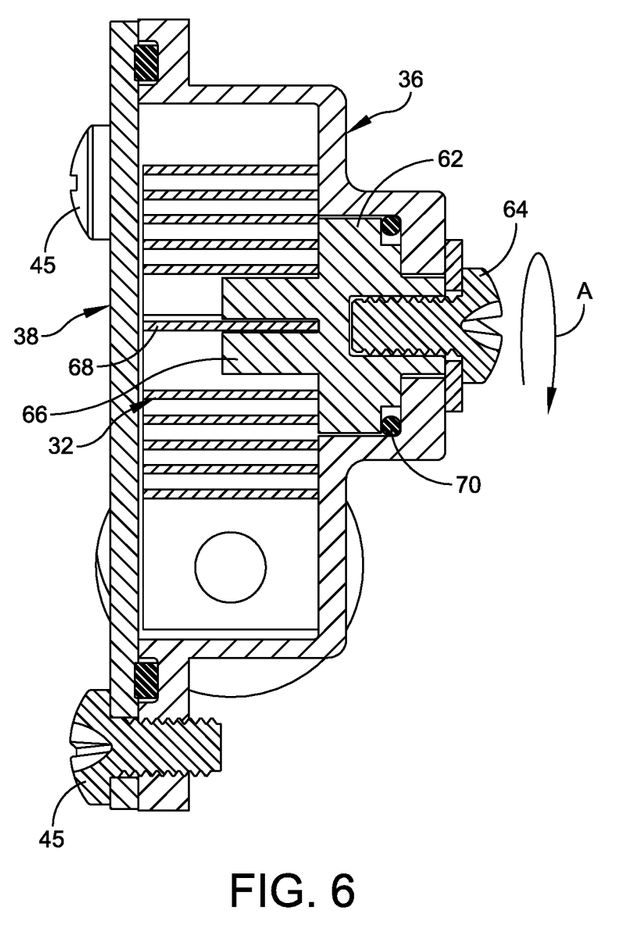
FIG. 6 is a cross-sectional view taken along line 6-6 of FIG. 4 showing further details of the adjustment feature of the bypass valve of the present invention.

The valve housing 36 has a hot water inlet port 50 from the hot water supply, a hot water exit port 52 to the hot fixture and a discharge port 54 to the cold water supply and to the cold water fixture. The valve body is comprised of essentially one piece containing the ports and allows for insertion of the bimetal coil as illustrated in FIGS. 4-6. The action of the coil 32 opens the discharge port to the cold water supply in the valve body at a preset temperature which allows water from the hot water supply to flow to the cold water supply when the water in the hot supply line cools to a preset temperature. This open position is illustrated in FIG. 5. When the temperature of the water in the valve body rises the coil expands closing the discharge port and stopping the flow of hot water to the cold water supply. This closed position is illustrated in FIG. 4. When the temperature of the water in the valve body is between the preset opening and closing temperatures the discharge port remains open and hot water that has cooled in the hot water supply flows to the cold water supply. To establish flow when water temperatures are between the preset opening and closing temperatures a pump in the hot water supply is operated. Refer to the pump 26 shown in FIG. 1. The check valve 42 incorporated in the discharge port of the valve body prevents the flow of water from the cold water supply to the hot water supply when hot water is called for at the hot water fixture. A bypass 41 may be placed between the hot water supply and cold water discharge port in the valve body to equalize pressure on both sides of the valve. The opening and closing temperatures of the under sink valve may be adjustable to allow the factory or the end user to change the temperature at which the valve opens and/or closes. The under sink valve may be integral to the shut off valve (angle stop) for the fixture.

A support member is used for mounting the bi-metal coil spring 32 within an internal chamber of the valve body or housing 36. The discharge port is defined by the insert 44 that comprises an elongated post with a passage defining, at an internal end, the discharge port 34. The bi-metal spring 32 is a coil spring having a center portion for support from the support member which is illustrated in FIGS. 4 and 5 by a post 60. The bi-metal coil spring is arranged in multiple coil loops including an outer loop having a free end that supports the shuttle 46. The shuttle 46 may be constructed of a soft plastic or rubber material that fits well with the port 34 of the valve insert 44 when in the closed position as illustrated in FIG. 4.

Reference is now made to an adjustable version of the coil in order to adjust the temperature at which the shuttle opens or closes at the valve port 34. To provide this adjustment feature refer to FIG. 6 which illustrates a more complete version of the center support that includes a center post 62.

In FIG. 6 the bi-metal coil spring 32 is rotationally adjustable to provide an adjustable temperature range as indicated by rotational arrow A in FIG. 6. This support includes, in addition to the post 62, a screw 64 that is mated with the post 62 which when tightened fixes the new setting of the support and coil. Rotation of the post 62 causes a circumferential rotation of the coil spring 32. The post 62 includes an inner piece 66 of smaller diameter than the post 62 and that engages with the center portion 68 of the coil spring 32. An O-ring seal 70 may also be provided between the post 62 and the housing 36 to form a seal. The post 62 adjusts the position of the coil by rotating the coil 32. In the position shown in FIG. 4 the coil 32 can be adjusted in alternate clockwise and counterclockwise directions to provide different opening temperatures. In FIG. 4 the adjustment would be clockwise to increase the shut off temperature set point.

The action of the coil spring and shuttle is such that the shuttle moves tangentially of the circular coil such as illustrated in FIG. 4. The insert 44 is thus disposed in that tangential direction as also noted in FIG. 4.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. Expansion and contraction of the bi-metal coil when the temperature changes may be reversed by reversing the two metals of the coil.

What is claimed is:

1. A water delivery system that includes hot and cold water lines that connect to respective hot and cold water fixtures and a bypass line, said hot water line including a hot water inlet pipe for receiving hot water from a hot water source and a hot water exit pipe that connects to the hot water fixture, said cold water line including a cold water inlet pipe for receiving cold water from a cold water source and a cold water exit pipe that connects to the cold water fixture, said bypass line including a bypass pipe that is connected between the hot and cold water lines and has one and other ends, and a bypass valve having a hot water inlet port that is connected to the hot water inlet pipe, a hot water exit port that is connected to the hot water exit pipe and a discharge port that is connected to the one end of the bypass pipe, said bypass valve further comprised of a valve body that defines an annular hollow internal chamber having a peripheral chamber wall, said hot water inlet port extending substantially tangentially of the peripheral chamber wall, said hot water exit port also extending substantially tangentially of the peripheral chamber wall, in line with said hot water inlet port and spaced about the peripheral chamber wall from said hot water inlet port, said bypass valve still further comprised of a bi-metal spring that is in the form of a center-mounted multiple coiled bi-metal spring having an outer free end, a support member for mounting the center of the bi-metal spring within the internal chamber of the valve body, and a shuttle mounted to the outer free end of the bi-metal spring and constructed and arranged to mate with the discharge port in a closed position of the bi-metal spring, said bi-metal spring assuming an open position to disengage from the discharge port at a predetermined water temperature to enable the hot water to discharge through the discharge port to the cold water line.

2. The hot water delivery system of claim 1 wherein the hot water inlet port has a center axis, the hot water exit port also has a center axis and the center axis of the hot water inlet port is coincident with the center axis of the hot water exit port.

3. The hot water delivery system of claim 2 wherein the peripheral chamber wall extends about the entire circumference of the annular hollow internal chamber and includes a port support wall surface that extends about less than half of the peripheral chamber wall, the hot water inlet port is disposed extending into one side of the port support wall surface and the hot water exit port is disposed extending from another side of the port support wall surface.

4. The hot water delivery system of claim 3 wherein the discharge port is disposed opposite and orthogonal to both the hot water inlet port and the hot water exit port.

5. The hot water delivery system of claim 1 including a pump for establishing a flow between the hot and cold water lines.

6. The hot water delivery system of claim 1 wherein the discharge port is defined by an insert that comprises an elongated post with a passage defining, at an internal end, the discharge port.

7. The hot water delivery system of claim 6 wherein the insert extends in a direction that is orthogonal to the hot water inlet and exit ports, and the shuttle adjustably rotates circumferentially between open and closed positions of the bi-metal coil spring, said support member for the bi-metal coil spring comprising a center support post that is rotatable to adjust the rotational position of the bi-metal coil spring.

8. The hot water delivery system of claim 1 wherein the peripheral chamber wall extends circumferentially and includes a circumferential port support wall surface having a tangentially arranged inlet having water communication with the hollow internal chamber and a tangentially arranged outlet having water communication with the hollow internal chamber.

9. The hot water delivery system of claim 8 wherein the circumferential port support wall surface extends about less than half of the peripheral chamber wall.

10. The hot water delivery system of claim 8 wherein the tangentially arranged inlet having water communication with the hollow internal chamber extends into the hollow internal chamber on one side of the circumferential port support wall surface and the tangentially arranged outlet having water communication with the hollow internal chamber extends into the hollow internal chamber on the same one side of the circumferential port support wall surface.

11. The hot water delivery system of claim 8 wherein a water flow between the tangentially arranged inlet and the tangentially arranged outlet pass over at least one coil of the center-mounted multiple coiled bi-metal spring.

12. The hot water delivery system of claim 11 wherein the water flow passes over multiple coils of the center-mounted multiple coiled bi-metal spring.

13. The hot water delivery system of claim 11 wherein the hot water inlet port has a center axis, the hot water exit port also has a center axis and the center axis of the hot water inlet port is coincident with the center axis of the hot water exit port.

14. The hot water delivery system of claim 13 wherein the tangentially arranged inlet having water communication with the hollow internal chamber and the tangentially arranged outlet having water communication with the hollow internal chamber are both arranged tangential with respect to the circumferential port support wall surface.

* * * * *